Patented Sept. 15, 1953

2,652,341

UNITED STATES PATENT OFFICE 2,652,341

ASPHALT EMULSION

Willis G. Craig, Cleveland, Ohio, assignor to The Lubrizol Corp., Wickliffe, Ohio, a corporation of Ohio No Drawing. Application March 25, 1950, Serial No. 152,007

2 Claims. (Cl. 106—277)

This application is a continuation-in-part of application Serial No. 51,649, filed September 28, 1948, now Patent No. 2,503,246, granted April 11, 1950.

The present invention relates to asphaltic emulsions of general application. More particularly, this invention relates to asphaltic emulsions, containing a minor amount of an asphalt improving agent, for use particularly as a bonding and coating agent for fibrous material, a bonding and coating agent of general utility in the manufacture and application of asphaltic felts and fabrics for use as waterproofing and surface protective coatings, etc.

Asphaltic materials have many uses in protective coatings in the form of molten asphalt, as cut-backs, and as emulsions. Molten asphalt application suffers from a number of serious deficiencies which materially reduce its applicability. Since the temperatures required to handle molten asphalt satisfactorily are high, its use is dangerous to personnel. Also, the high temperatures are deleterious to the asphalt and a considerable amount of "life" of an asphalt is destroyed by overheating in the melting kettle. Furthermore, in the application of hot asphalt in roofing the special equipment and the man-hours of labor required add very materially to the cost of the roof.

Cold-process applications of asphalt to overcome these difficulties have been widely attempted. These attempts have been centered along two lines; namely, cut-back formulations and emulsions.

Cut-back formulations consisting of solutions of asphalt in various organic solvents are inherently expensive because of the cost of the solvent. They also suffer from the fire hazard concomitant with the use of a volatile organic solvent and furthermore, such formulations offer many problems in adhesion to the underlying structure and in "blistering" of the surface due to entrapped solvent vaporizing under the hardened surface film.

Emulsified asphalts eliminate the use of heat and special melting equipment. Application is quick and economical either by brush or by spray and there is no fire or toxicity hazard from organic solvents. In the past in an effort to improve such asphalt emulsions, a colloidal clay has been added which keeps such a coating free from blistering and produces a coating which is the most resistant to weathering of any of the asphaltic films. Present emulsions, however, suffer from a number of inherent drawbacks. It is difficult to be assured of adequate wetting and adherence to dry or dusty surfaces, to mineral fibers, and to metal surfaces. At high asphalt concentrations, asphalt emulsions tend to be buttery or putty-like in physical character which makes their application difficult especially in spray applications. Furthermore, asphalt emulsions are prone to break during shipping or storage if they are of the type that will dry quickly after application, because emulsions which are stabilized against "breaking" by the addition thereto of the usual protective colloids have their "setting" time greatly lengthened causing them to remain in a soft and re-emulsifiable condition for many hours. This makes them extremely hazardous to use where there is any chance of water coming into contact with them before they are thoroughly "set." By means of my invention I am able to produce asphalt emulsions which are stabilized against breaking without unduly lengthening their setting time.

It is an object of this invention to provide an asphalt emulsion containing a minor amount of an asphalt improving agent to overcome the above deficiencies.

A further object of this invention is to provide an asphalt emulsion which remains in a homogeneous fluid state over a long period of time and does not invert to a water-in-asphalt form nor agglomerate to solid asphalt.

A still further object of this invention is to provide an asphalt emulsion for a superior wetting and adhesive or bonding characteristics.

Another object of this invention is to provide an asphalt emulsion having superior penetrating and coating properties toward woven or felted fibrous materials.

Another object of this invention is to provide an asphalt emulsion which more rapidly and thoroughly sets after application and which has superior weathering and anti-oxidation properties.

Another object of this invention is to provide an asphalt emulsion that is feasible of commercial production and which has a universal applicability not previously obtainable.

Further and additional objects will appear as the description proceeds.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, my invention comprises an as- 2,652,341 phaltic composition comprising a major amount of a stable clay-type asphalt-in-water emulsion and a minor amount of a surface active agent which is slightly water soluble but to only a minor extent and is soluble in asphaltic materials to a substantially greater extent. In the preferred embodiment of my invention the stable clay-type emulsion is first formed and to the thus formed emulsion the minor amount of surface active agent is then added.

It is important that the surface active agent referred to above have the correct balance between asphalt and water solubility. Instead of defining such materials as being "water soluble but to only a minor extent" it might be more accurate to define them as being of the type which, when dissolved in the asphalt will, because they are water soluble to a certain extent tend to be oriented toward water at the water-hydrocarbon interface. Thus an organic compound which is completely asphalt soluble and water insoluble may be rendered useful as an additive in my compositions by the introduction into the molecule thereof of a hydrophilic salt-forming group or radicle, the size and effectiveness of which is such as not to greatly reduce the asphalt solubility of the molecule but to impart thereto at least a minor degree of water solubility or more accurately a tendency to orient the molecule toward water at the water-hydrocarbon interface. When no such orienting substituent is present, i. e., a hydrophilic salt-forming radicle, then the molecule of the addition agent or more accurately the hydrophobic substituent groups thereof should be of such size that the molecule is at least slightly water soluble but is still asphalt soluble to a substantially greater extent.

By the term "hydrophilic salt-forming radicle" as used herein and in the appended claims, I mean to define those radicles and elements the presence of which in the molecule will tend to orient the molecule toward water at the water-hydrocarbon interface, such as those selected from the class consisting of alkali metals, ammonium and organic substituted ammonium.

Throughout this specification and the claims attached hereto, when the term "Wax" is used, it is intended to refer to $C_{18}$ to $C_{24}$ Paraffin wax.

I. DESCRIPTION OF THE SURFACE ACTIVE AGENTS

The principle and preferred materials which I have found desirable for use as such surface active agents are the following:

*Group I.*—Those hydrophilic salts of organic sulphonic acids containing 18 or more carbon atoms per sulphonate group and additional substituents in the molecule selected from the class of O, S, $NH_2$, NH, N, OH, $NO_2$, and C=O. Examples of such salts are:

A. Sulphonates of alkyl aryl ethers, e. g.

1. 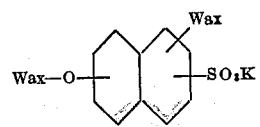

2. 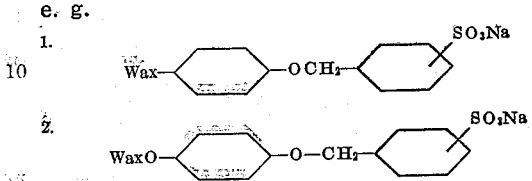

3. 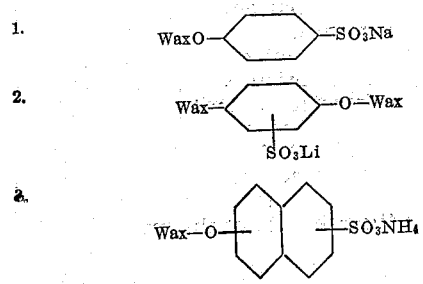

4. 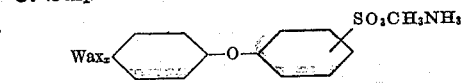

B. Sulphonates of alkyl phenyl benzyl ethers, e. g.

1.

2.

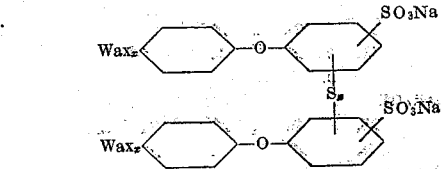

C. Sulphonates of alkyl diphenyl ethers, e. g.

1. 

D. Sulphonates of alkyl diphenyl ether sulphides, e. g.

1. 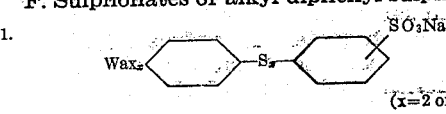

E. Sulphonates of alkyl diphenyl thio ethers, e. g.

1. 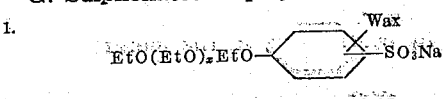

F. Sulphonates of alkyl diphenyl sulphides, e. g.

1. 

(x=2 or more)

G. Sulphonates of polyether aryl ethers, e. g.

1.

2.

3.

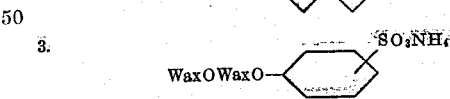

H. Sulphonates of polyether substituted aromatics, e. g.

1.

2.

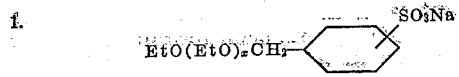
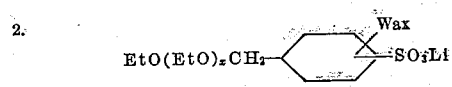

I. Sulphonates of alkyl hydroxy aromatics, e. g.

1. 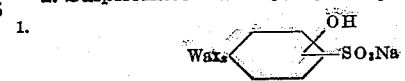

2. 

J. Sulphonates of alkyl bis phenols and alkyl phenol-formaldehyde condensates, e. g.

1.

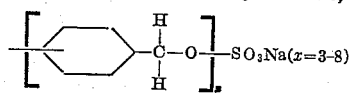

2.

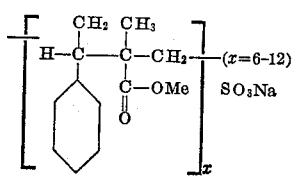

K. Sulphonates of polyether hydroxy aromatics, e. g.

1.

EtO(EtO)$_x$EtO—⟨⟩—SO$_3$Na (with OH)

2.

EtO(EtO)$_x$Et—⟨⟩—SO$_3$Na (with OH, Wax)

3.

EtO(EtO)$_x$Et—⟨⟨⟩⟩—SO$_3$Na (with OH, Wax)

L. Sulphonates of poly benzyl ethers, e. g.

$$\left[\langle\rangle\text{—CH—O—}\right]_x \text{SO}_3\text{Na} \quad (x=3\text{-}8)$$

M. Sulphonates of styrene-methyl methacrylate co-polymer $$\left[H-\overset{CH_2}{\underset{\langle\rangle}{C}}-\overset{CH_3}{\underset{C=O|OMe}{C}}-CH_2-\right]_x \text{SO}_3\text{Na} \quad (x=6\text{-}12)$$

N. Sulphonates of the "Nytron" type, e. g. Wax Olefin NOCl NaSO H . . ., and derivatives thereof

1.

R—CH—CH$_2$SO$_3$Na
     |
     NO

2.

R—CH—CH$_2$SO$_3$N
     |
     NH$_2$

3.

R—C(=O)—CH$_2$—SO$_3$Na

*Group II.*—Hydrophilic salts of organic sulphonic acids containing 18 or more carbon atoms per sulphonate group.

Examples of this class of compounds are:
A. Sodium petronate (mahogany acid soap)
B. Sodium alkaryl sulphonates, e. g.

1.

C$_{12}$H$_{25}$—⟨⟩—SO$_3$Na, Wax—⟨⟩—SO$_3$Na

2.

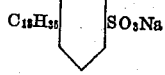

3.

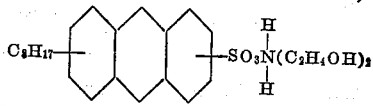

4.

C. Alkanolamine alkaryl sulphonates, e. g.

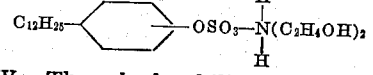

*Group III.*—Those hydrophilic salts of sulphated alcohols having 18 or more carbon atoms per sulphate radicle. Examples of such salts are:
A.     C$_{18}$H$_{35}$OSO$_3$K
B.     WaxOSO$_3$Na C. 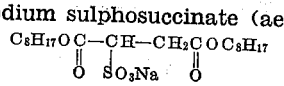

*Group IV.*—Those hydrophilic salts of diesters of sulphonated diacids having at least 4 carbon atoms in the acid portion and at least 8 carbon atoms in the ester portion of the molecule. Examples of this class of compounds are:

1. dioctyl sodium sulphosuccinate (aerosol OT):

C$_8$H$_{17}$OC(=O)—CH—CH$_2$C(=O)OC$_8$H$_{17}$
              |
              SO$_3$Na

2. Dilauryl sodium sulphosuccinate

C$_{12}$H$_{25}$O—C(=O)—CH—CH$_2$C(=O)OC$_{12}$H$_{25}$
                |
                SO$_3$Na

*Group V.*—Those hydrophilic salts of organic substituted hydroxy aryl sulphinic acids having an organic substituent containing six or more carbon atoms.

Examples of this class of compounds are:
1. Sodium wax hydroxyphenyl sulphinate:

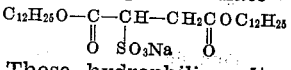

2. Na diisobutyl hydroxyphenyl sulfinate:

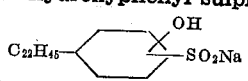

*Group VI.*—Those hydroxy ethers and their sulphur analogues wherein the organic portion of the molecule contains at least twelve carbon atoms.

Examples of this class of compounds are:

1. (C$_8$H$_{17}$OCH$_2$)$_2$C(CH$_2$OH)$_2$
 (Dioctyl ether of pentaerythritol)

2. C$_{12}$H$_{25}$OCH$_2$—CH—CH$_2$OH
                 |
                 OH
 (Glycerol mono lauryl ether)

3. C$_{18}$H$_{37}$OCH$_2$(CHOH)$_4$CH$_2$OC$_{18}$H$_{37}$
 (Distearyl ether of sorbitol)

4. C$_{16}$H$_{33}$OCH$_2$CH—CH$_2$
               |   |
               OH OH
 (Glycerol mono-cetyl ether)

5. C$_{12}$H$_{25}$SCH$_2$CH$_2$SH (mono lauryl ether of symetrical di mercapto ethane)

*Group VII.*—Those polyether alcohols and their sulphur analogues wherein the organic portion of the molecule contains at least twelve carbon atoms.

Examples of this class of compound are:
1. C$_{12}$H$_{25}$OCH$_2$CH$_2$O(CH$_2$)$_2$OCH$_2$CH$_2$OH (mono lauryl ether of triethylene glycol)

2.

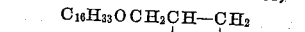

(Mono octyl phenyl ether of diethylene glycol)

3. $C_{12}H_{25}O(CH_2CH_2O)_nCH_2CH_2OH$ (mono lauryl ether of polyethylene glycol) ("Carbowax")

4. $C_8H_{17}SCH_2CH_2SCH_2CH_2SH$

*Group VIII.*—Those polyethers and their sulphur analogues wherein the organic portion of the molecule contains at least twelve carbon atoms.

Examples of this class of compounds are:

1. $C_8H_{17}OC_2H_4OC_2H_4OC_2H_4OC_8H_{17}$ (dioctyl ether of triethylene glycol)

2. $C_4H_9O(C_2H_4O)_nC_2H_4OC_4H_9$ (dibutyl ether of polyethylene glycol) ("Carbowax")

3. $C_8H_{17}SCH_2CH_2SCH_2CH_2SC_8H_{17}$

*Group IX.*—Those hydrophilic salts of carboxylic and substituted carboxylic acids containing at least 14 carbon atoms per carboxylic group in the organic portion of the molecule and which may contain in addition polar groups selected from the class consisting of C=C, O, S, N, NH, $NH_2$, OH, $NO_2$, and C=O;

Examples of this class of compounds are:

A. Soaps of aliphatic and substituted aliphatic acids, e. g.

1. $C_{17}H_{35}COOK$

2. $CH_3(CH_2)_5CHCH=CH(CH_2)_7COOK$
   $\quad\quad\quad\;\; |$
   $\quad\quad\quad\;\; OH$
   (Potassium ricinoleate)

3. $C_8H_{17}$—〈 〉—$OCH_2CH_2COONa$
   (Sodium octyl phenoxy propionic acid)

4. $C_4H_9OCH_2CH_2O$—〈 〉—$CH_2CH_2COONa$

5. Wax—〈 〉—$COOK$

*Group X.*—Those primary, secondary and tertiary amines containing at least sixteen carbon atoms in the organic portion of the molecule.

Examples of this class of compounds are:

1. $(C_8H_{17})_2NH$

2. $(C_8H_{17}$—〈 〉—$)_3N$

3. $WaxNH_2$, $Wax_2NH$

4. $CH_3(CH_2)_{16}CH_2NH_2$

5. $CH_3(CH_2)_{16}CH_2NEt$
   $\quad\quad\quad\quad\quad\;\; |$
   $\quad\quad\quad\quad\quad\;\; H$

*Group XI.*—Those amides, N-substituted amids and their analogues containing at least sixteen carbon atoms in the organic portion of the molecule.

Examples of this class of compounds are:

1. $C_{17}H_{35}CON(Et)_2$

2. $C_{17}H_{35}CON(C_2H_4OH)_2$

3. $C_8H_{17}$—〈 〉—$O$—$(CH_2)_2CONH_2$

4. Wax—〈 〉〈 〉—$CH_2CON(C_2H_4OH)_2$

5. 〈 〉—$CH_2CH_2CSNHC_8H_{17}$

6. $C_{17}H_{35}CSNH_2$

7. 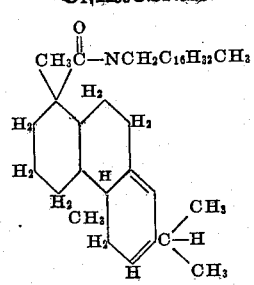

8. 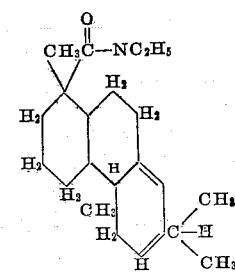

*Group XII.*—Those organic sulfonamids and N-substituted sulfonamids containing at least 16 carbon atoms in the organic portion of the molecule.

Examples of this class of compounds are:

1. $C_{18}H_{37}SO_2NH_2$

2. $C_{18}H_{37}SO_2$—$\overset{H}{\underset{|}{N}}$—$C_2H_5$

3. $WaxSO_2$—$\overset{H}{\underset{|}{N}}$—$C_{18}H_{37}$

4. $WaxSO_2\overset{H}{\underset{|}{N}}$—$C_2H_3OH$

5. Me〈 〉—$SO_2\overset{H}{\underset{|}{N}}$—$C_{18}H_{37}$

6. 〈 〉〈 〉—$SO_2$—$\overset{H}{\underset{|}{N}}$—$C_4H_9$

7. $WaxSO_2N(C_2H_5)_2$

*Group XIII.*—Those hydroxy esters having at least 12 carbon atoms in the organic portion of the molecule and at least one hydroxyl group in molecule.

Examples of this class of compounds are:

1. $C_{17}H_{33}COOCH_2(CHOH)_4CH_2OOCC_{17}H_{33}$
   (sorbitol dioleate)

2. $C_{17}H_{35}COOCH_2C(CH_2OH)_3$
   (pentaerythritol mono stearate)

3. $C_{12}H_{25}COOCH_2CH_2O$—$(CH_2)_2OCH_2CH_2OH$
   (tri-ethylene glycol mono laurate)

4. $C_{17}H_{35}COOCH_2$—$CHOH$—$CH_2OH$
   (stearyl monoglyceride)

*Group XIV.*—Mono and diesters of polyether glycols having at least 12 carbon atoms in the organic portion of the molecule.

Examples of this class of compounds are:

1. $C_{11}H_{23}COOC_2H_4(OC_2H_4)_nOC_2H_4OOCC_{11}H_{23}$
   ("Carbowax" dilaurate)

2. 〈 〉—$COOC_2H_4(OC_2H_4)_nOC_2H_4OOC$—〈 〉

3. $C_{17}H_{35}COOC_2H_4OC_2H_4OC_2H_4OOCC_{17}H_{35}$

*Group XV.*—Those hydrophilic salts of acid organic derivatives of phosphorous which derivatives contain 12 or more carbon atoms in the molecule.

Examples of this class of compounds are:

1. 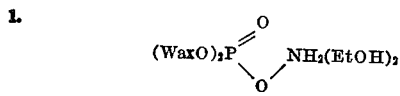
2. 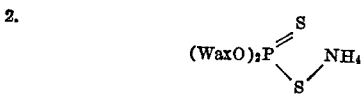
3. 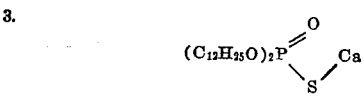
4. 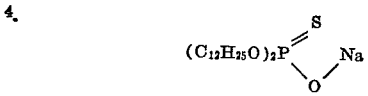
5. 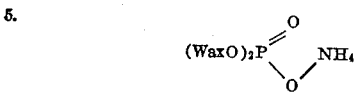
6. 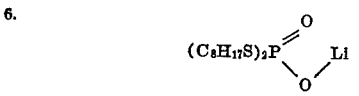
7. 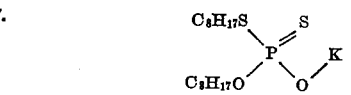
8. 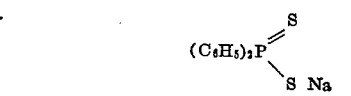
9. 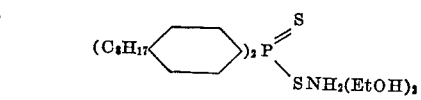
10. 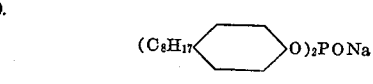
11. 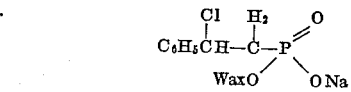
12. 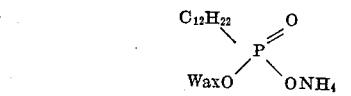

*Group XVI.*—Those phosphamids and N-substituted phosphamids of acid organic derivatives of phosphorous which derivatives contain 12 or more carbon atoms in the molecule.

Examples of this class of compounds are:

1. 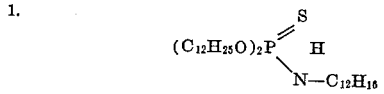
2. 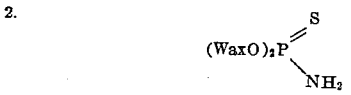
3. 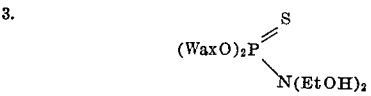
4. 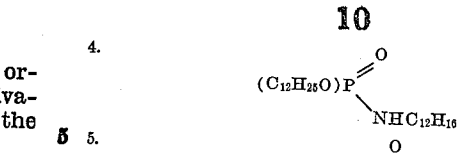
5. 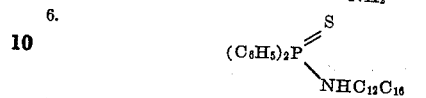
6. 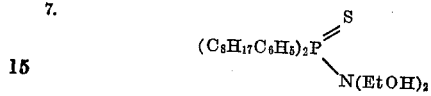
7. 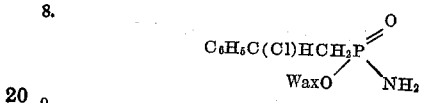
8. C₆H₅C(Cl)HCH₂P(=O)(WaxO)(NH₂)
9. C₁₂H₂₂—P(=O)(WaxO)(NHEtOH)

*Group XVII.*—An alkyd resin of low molecular weight having the formula (—OOCRCOOR'—)$_x$ wherein R is the hydrocarbon residue of a dibasic acid; R' is a hydrocarbon residue of a polyalcohol; and $x$ is an integer.

Examples of this class of compounds are:

1. glycerol phthalate resin
2. glycerol maleate resin
3. poly allyl carbonate

II. GENERAL DESCRIPTION OF PREPARATION OF THE ABOVE TYPE COMPOUNDS

The following examples are illustrative of the mode in which the asphalt addition agents of my invention may be prepared and are included for illustrative purposes only and are not to be construed as limiting my invention to the precise materials described. In this specification when reference is made to a wax substituent group, it is intended to refer to a petroleum wax containing from 18 to 24 carbon atoms. The example members used below refer to compounds in the above particular groupings.

*Example 1a–1*

One mole of mono-chlor paraffin wax ($C_{20}$—$C_{22}$) was reacted with one mole of sodium phenate at 160° C. for 2 hours. NaCl formed during the reaction was filtered from the hot wax phenyl ether. To the filtrate was added 1.1 mole of chlorsulphonic acid and the reactants agitated at 40–60° C. for two hours following which the reaction mass was blown with nitrogen for ½ hour to remove HCl and then neutralized with NaOH.

2% of a 15% water solution of the sodium wax phenyl ether sulphonate product of the above reaction was added to a preformed clay-type asphalt emulsion and mixed for 15 minutes in a beater-type mixer. The treated emulsion was markedly less viscous than the original emulsion and maintained this fluidity during a one-month shelf storage test without separation or agglomeration of the asphalt phase.

*Example 1b–1*

Wax phenol was prepared by alkylating a wax olefin ($C_{20}$—$C_{22}$) with phenol in the presence of an acid-activated clay (Superfiltrol). The wax phenol was converted to the phenate with sodium metal and the wax sodium phenate so prepared was reacted in equimolar proportions with benzyl chloride. The reaction mixture was filtered to remove NaCl and then reacted with 1.05 moles of chlorsulphonic acid. The wax phenyl benzyl ether sulphonic acid produced was blown with nitrogen to remove HCl and then neutralized with 10% excess KOH.

2% of a 15% water solution of the product of this example was added to a preformed clay-type asphalt emulsion with the same results as were obtained in Example (1a-1).

*Example 1h-2*

This material may be prepared by alkylating wax olefin with toluene using an acid-activated clay catalyst (Superfiltrol) followed by chlorination of the alkylate in the presence of light in an absolutely iron-free system to yield the wax alkylated benzyl chloride.

The wax benzyl chloride is dissolved in tetra-ethylene glycol dimethyl ether and to the solution is slowly added one molecular equivalent of the sodium alcoholate of diethylene glycol mono-ethyl ether with constant stirring at a temperature of about 60° C. The salt formed in the reaction is filtered from the solution and 1.05 molecular equivalents of chlorsulphonic acid are added slowly at about 40–60° C. After the sulphonation is complete the solution is blown with nitrogen and neutralized with NaOH after the tetra-ethylene glycol dimethyl ether is stripped from the product by vacuum distillation.

*Example 1i-1*

½ mole wax phenol (prepared as in Example 1b-1) was sulphonated by adding 0.525 mole of chlorsulphonic acid dropwise to the agitated alkyl phenol at 60–70° C. After the sulphonation was complete, the reaction mixture was blown with nitrogen to remove HCl and the wax hydroxy phenyl sulphonic acid neutralized with sodium hydroxide. The resulting product was diluted with water to yield a 15% solution of wax hydroxy phenyl sodium sulphonate.

2% of the above water solution was added to a clay-type asphalt emulsion and thoroughly incorporated therein by mixing with a beater-type mixer. Marked reduction of viscosity of the emulsion, which had a 55% asphalt content, was noted—the reduction of viscosity being such that the emulsion which had been putty-like in consistency became fluid enough to pour easily. Shelf storage for 3 months showed no tendency for the treated emulsion to separate or agglomerate and, while the emulsion had gelled or stiffened slightly during the shelf storage, it was readily reduced to a pourable and sprayable viscosity by mild hand stirring.

Exposure panels made from the treated emulsion showed excellent adherence to glass and metal surfaces and remarkable softness and plasticity.

*Example 2a*

"Sodium petronate" is the trade name of the sodium salts of the oil-soluble petroleum "mahogany acids" which are extracted from the sludge obtained on treating petroleum oils with fuming sulphuric acid. These "mahogany" petroleum sulphonic acids differ from the "green" petroleum sulphonic acids in that they are oil-soluble and substantially water-insoluble. I have found that the incorporation of from 0.1% to 2% of the hydrophilic salts of the mahogany acids into the clay slurry at the start of the emulsification process results in the inversion of the emulsion; i. e., the asphalt becomes the continuous phase instead of the dispersed phase. However, I have found that 0.1% to 2% of sodium petronate can be incorporated into a preformed clay-type emulsion by careful stirring once the emulsion is formed without breaking the emulsion and that emulsions so treated show desirable fluidity at high asphalt content and good wetting of surfaces to which asphalt does not normally adhere well. Asphalt emulsions treated with sodium petronate in the above manner are not stable to long storage nor are the dried films derived from such emulsions as stable to weathering as compositions of other examples.

*Example 2b-4*

A mono alkyl benzene having a side chain of 18–20 carbon atoms was sulphonated with one molecular equivalent of chlorsulphonic acid by introducing the acid beneath the surface of the agitated hydrocarbon at 30–40° C. over a period of one hour. The reaction mixture was blown with nitrogen for 15 minutes to remove dissolved HCl, and was then neutralized with 10% excess NaOH, heated and stirred for two hours. The product had the following analysis:

|  | Theory | Found |
|---|---|---|
| Percent S | 6.3 | 5.33 |
| Percent SO₄ ash | 14.1 | 16.0 |

Several attempts were made to produce a satisfactory asphalt emulsion using the product of the above example as an adjunct to a bentonite clay slurry. In all cases it was found that a satisfactory emulsion could not be formed in this manner as the sulphonate promoted the inversion of the emulsion in the mixer before a satisfactory asphalt content was reached.

It was found, however, that when the product of the above example was added to a preformed asphalt emulsion of the colloidal clay type that from 0.1% to 2% of the sulphonate (based on the asphalt in the emulsion) could be readily incorporated without deteriorating the emulsion in any way. The best procedure for the incorporation of the product of the above example is to add the sulphonate as a 15% to 30% water solution to the asphalt emulsion in the emulsification beater after the desired percentage of asphalt has been thoroughly dispersed. An additional 5 to 10 minutes beating time after the addition of the sulphonate will produce a smooth, creamy emulsion of pourable consistency even at asphalt concentrations of 50–70%.

An emulsion formulated in the above manner is very stable to storage showing little or no separation of the water phase or settling or agglomeration of the asphalt phase even after long storage. Some stiffening of the emulsion will be noted after prolonged storage but moderate hand stirring will reduce the viscosity to a pourable and sprayable consistency which will be maintained for a period of several days following the hand stirring. In addition, an emulsion so formulated exhibits excellent wetting and penetrating properties, especially for glass fibers, excellent adherence to dry or dusty surfaces, and marked resistance to age hardening of the coalesced asphalt films deposited from the emulsion or application.

Example 3b

Wax alcohol was prepared from a mono-chlor paraffin wax (15% chlorine) by reacting 1 mole of the chlorwax with one mole sodium acetate in the presence of 1.5% of pyridine (based on the chlorwax). The reaction mixture was refluxed 16 hours, separated, and stripped. 20% excess of the theoretical amount of KOH was added to the above product together with methanol as a solvent and the whole refluxed for 2½ hours. The reaction mixture was then washed with water to remove potassium acetate, separated, and the oily layer stripped to remove any dissolved methanol. The hydorxyl value of the product was 6.85% (theory 7.04%). The wax alcohol so produced was then sulphated at 5-10° C. with chlorsulphonic acid, blown with nitrogen, and neutralized with NaHCO₃. The extracted, filtered and stripped product had a sulphate ash content of 17.3% (theory 15.9%).

2% of a 15% water solution of the wax sodium sulphate so produced was added to a 55% solids content asphalt emulsion and thoroughly incorporated therein by a beater-type mixer. Considerable foaming of the emulsion was encountered as was noted for the potassium ricinoleate (see Example 9a-2), but a better consistency and more fluid final product was obtained which showed improved characteristics of wetting and spreading and adequate shelf storage stability.

Example 6a 2 moles of diisobutenyl mono-chloride was added to one mole of pentaerythritol. 2 equivalents of NaOH as concentrated water solution was added and the whole refluxed with a side-arm water trip until evolution of water ceased. The reaction mixture was then thoroughly washed to remove any unreacted diisobutenyl chloride. A yield of 82% of a product having a hydroxyl value of 8.9% (theory 9.5%) was obtained.

Example 9a

One mole of methyl oleate was reacted with 1.1 mole of diethanol amine for 1½ hours at 200-215° C. in the presence of 2 grams of sodium methoxide as a catalyst. Methyl alcohol was removed as formed by evaporization.

The product was thoroughly washed with water to remove any excess of diethanol amine, dried by azeotropic distillation with benzene, filtered, and the benzene stripped off. A product having 4.21% nitrogen (theory 4.31%) was obtained in 83% yield.

Example 9a-2

Commercial ricinoleic acid was neutralized with potassium hydroxide and a 15% solution of the soap was prepared by dilution with water.

2% of the above solution was added to a preformed clay-type asphalt emulsion and incorporated therein by agitation with a beater-type mixer. Considerable foaming occurred during the mixing and the treated emulsion had a grainy appearance. However, it showed excellent wetting properties which applied to dry and dusty surfaces but was not as satisfactory as other compositions described herein, particularly in regard to storage stability.

Example 14b

Wax alcohol (prepared by the controlled oxidation of a paraffin wax, C₂₀—C₂₂ was reacted with $P_2S_5$ at a ratio of 4 moles of alcohol to 1 mole $P_2S_5$ by heating the reactants for 2 hours at 96° C. until the evolution of H₂S had ceased. The filtered di-wax di-thiophosphoric acid from this reaction had the following analysis:

|  | Theory | Found |
| --- | --- | --- |
| Percent S | 8.1 | 7.96 |
| Percent P | 3.96 | 3.81 |

The acid number of the product was 86% of theory. The product was then neutralized with ammonia to produce the desired ammonium salt.

III. CONCENTRATION OF THE ASPHALT ADDITION AGENT

The additives to be employed are stable up to about 15% in the emulsion. However, I have found that an effective range is from about .05% to about 2% by weight and preferably from about 0.1% to about 1% based on the weight of asphalt emulsion. Since the addition agents of the present invention are usually used in asphalt or asphalt emulsions in such relatively low concentrations, and since they are generally soluble up to about 5-25% in water, a convenient method of incorporating them is to prepare a solution in water, say about 15%, and use such solution as the addition material. When a water solution of the additive is thus employed an amount of solution will be used to impart the desired percentage of the additive compound to the final composition.

IV. THE IMPROVED ASPHALT EMULSION

It is to be understood that the term "asphalt" as used herein and in the appended claims is intended to include natural asphalt, blown petroleum asphalt, bitumen, etc.

To produce a conventional asphalt emulsion in which the asphalt addition agent of the present invention is to be incorporated, the usual procedure is to combine the asphalt, water, and an emulsifying agent, such as bentonite, and mechanically agitate the mixture until a suitable asphalt emulsion is secured. In the preparation of the asphalt emulsion, the amount of water present in the emulsion will vary from between about 30% by weight up to about 90% by weight. The amount of water present is usually dependent upon the ultimate use for which the asphalt emulsion is intended, although in general, the water is usually present in a commercial emulsion in an amount of about 50% by weight.

In the examples previously given when the asphalt emulsion is not specifically identified, it was emulsion consisting of 50% asphalt-in-water plus 4% bentonite.

To incorporate my improved addition agent in the asphalt emulsion, the preferred manner is to first prepare a 15% water solution of the asphalt addition agent. An amount of the solution selected from the range of 0.5% to 10% is then incorporated in the asphalt emulsion by ordinary agitation. The improved asphalt emulsion is then ready for use. The addition agent may be incorporated in the asphalt emulsion without first forming a water solution since its solubility in the emulsion is about the same as in the water. When this method is chosen an amount of from between .07% to 2% by weight of the addition agent may be incorporated in the asphalt emulsion by ordinary agitation.

These new and improved asphalt emulsions posses a combination of many desired properties hereofore unobtainable. I have found that it is virtually impossible to make a satisfactory asphalt emulsion by incorporating the wetting agents of the type described herein in a clay slurry and then dispersing the asphalt into the slurry. Whenever this procedure is attempted, inverted (water-in-asphalt) emulsions are formed. If by very careful manipulation and the use of a "heel" of standard emulsion in the emulsification equipment the desired asphalt-in-water emulsion is formed at the beginning of the operation, we find that only a small amount (about 25%) of asphalt can be added without the emulsion breaking and the asphalt phase agglomerating. Consequently, it appears that the procedure of carefully adding the surface active agent to an already formed emulsion is the only feasible way to incorporate satisfactory surface active agents into an asphalt emulsion. Thus, I have found that if a clay-type asphalt-in-water emulsion is manufactured using standard procedures, surface active agents of relatively high asphalt solubility can be added to the preformed emulsion and incorporation therein by mild agitation without breaking the preformed emulsion or markedly interferring with its storage stability. In fact, in some cases the stability of the emulsion is enhanced and separation of the water phase and settling of the asphalt phase is decreased.

Such four component emulsions (asphalt, colloidal clay, surface active agent and water) exhibit the unusual characteristics of fluidity at high asphalt concentrations, good stability, resistance to flow or creep of dried films at elevated temperatures, resistance to hardening and cracking of the asphalt films on exposure to the weather, and excellent adherence to dry, dusty or lyophobic surfaces.

While this specification has been restricted to four component emulsions (asphalt, colloidal clay, surface active agent and water), there are herein disclosed many surface active materials which when added to asphalt emulsions not containing colloidal clay will achieve an improved asphalt emulsion.

I am unable at this time to provide a scientific explanation as to why the addition agents of the present invention impart these many and desirable properties to the emulsion. One possible theory is that the additives not only possess the proper polarity so as to be somewhat soluble in water but also possess a balance between molecule size due to the aliphatic substituents, and water or asphalt solublity such that the asphalt emulsion remains stable and is not inverted to a water-in-asphalt form.

V. ILLUSTRATIVE EXAMPLES OF THE IMPROVED ASPHALT EMULSIONS

It becomes convenient to list a few illustrative and representative examples of finished asphalt emulsions included within the scope of the present invention. It is to be noted that the percentages for the addition agent are given on the dry basis, i. e. as though the material were added in its pure form and not as a water solution. It is to be understood however, that corresponding amounts of the addition agent may be added as a water solution in the manner previously indicated.

*Example I*

| | Per cent |
|---|---|
| 50% asphalt in water emulsion plus 4% bentonite | 99.4 |
| Sodium salt of wax-substituted diphenyl ether sulphonic acid disulphide | 0.6 |

*Example II*

| | Per cent |
|---|---|
| 50% asphalt in water emulsion plus 4% bentonite | 99.0 |
| Sodium petronate (sodium salt of oil soluble petroleum "mahogany acids") | 1.0 |

*Example III*

| | Per cent |
|---|---|
| 50% asphalt in water emulsion plus 4% bentonite | 93.2 |
| Styrene methyl methacrylate co-polymer | 1.8 |

*Example IV*

| | Per cent |
|---|---|
| 50% asphalt in water emulsion plus 4% bentonite | 99.1 |
| Potassium ricinoleate | 0.9 |

*Example V*

| | Per cent |
|---|---|
| 50% asphalt in water emulsion plus 4% bentonite | 99.0 |
| Sorbitol dioleate | 1.0 |

*Example VI*

| | Per cent |
|---|---|
| 50% asphalt in water emulsion plus 4% bentonite | 99.2 |
| Mono lauryl ether of poly ethylene glycol ("Carbowax") | 0.8 |

VI. USES OF THE ASPHALT EMULSIONS

As previously indicated, there is a wide variety of uses for which the improved asphalt emulsions of the present invention may be employed. It therefore becomes convenient at this point to give in detail a number of illustrative uses of my improved asphalt emulsion.

In the roofing industry today, conventional practice in the application of built-up roofs has been to first apply a "base sheet" of dense asphalt impregnated felt to the roof surface by nailing or "spot-sticking" with adhesives. Then a layer of molten asphalt is applied to this by mopping. Another layer of dense asphalt felt is rolled into the soft asphalt and the process repeated until the desired number of plies of felt have been applied. A final sealing coat of hot asphalt is then mopped on the surface. This is a relatively slow and expensive method of application and subject to a number of disadvantages, such as deterioration of the asphalt in the melting kettle, blistering and delamination of the finished roof, lack of weathering qualities, etc.

Asphalt emulsion, because of its water content, cannot be used satisfactorily as a bond between layers of impervious felts. Emulsions have been widely used however as a final sealing coat and as a repair coating in treating existing deteriorated roofs. In the latter case results have often been poor because of lack of bonding between the dry, dusty existing roof surface and the asphalt film laid down from an emulsion. In such cases, a surface treatment with a priming coat of thin asphalt cut-back is often resorted to, but this greatly increases the application cost.

The use of a porous mat or an open weave fabric as the reinforcing medium in a built-up roof allows the economical use of asphalt emulsions as a bonding medium and results in an excellent reinforced monolithic roof surface instead of the laminar surface obtained with impervious felts and hot asphalt. However, the use of such materials has not achieved wide acceptance because the difficulty encountered with conventional emulsions in regard to penetrating, wetting and adhering to such porous mats or fabrics particularly if the mats or fabrics are composed of inorganic materials such as glass, etc.

Further disadvantages of conventional emulsions are the high viscosity of high-solids content emulsions which make them difficult to handle with spray equipment and their very slow setting or drying time which makes them susceptible to reemulsification and destruction by rain even as long as 8 hours after application.

I have found, however, that by incorporating the asphalt additives of the present invention in a standard emulsion that most of all of the above mentioned difficulties were overcome. The asphalt emulsion is in a very fluid state, has excellent wetting properties, impregnates easily, possesses quick-setting properties, has high bonding and adhesive properties, and possesses excellent anti-oxidation and weathering properties. The following comparison tests clearly demonstrate the foregoing statements.

Test 1

One ply of glass fabric previously impregnated with a standard hot asphalt was applied to a metal deck by using standard asphalt emulsion[1]. A final coat of untreated asphalt emulsion[1] was then applied over the glass fabric. The temperature at the time of application was about 60° C.

Test 2

One ply of glass fabric previously impregnated with a standard hot asphalt was applied to a metal deck by using standard asphalt emulsion[1] containing 2% of sodium petroleum sulphonate. A final coat of treated asphalt emulsion was then applied over the glass fabric. The temperature at the time of application was about 60° C.

Test 3

One ply of glass fabric previously impregnated with a standard hot asphalt was applied to a metal deck by using standard asphalt emulsion[1] containing 1% of sodium salt of wax-substituted diphenyl ether sulphonate disulphide. A final coat of the asphalt emulsion containing the additive was then applied over the glass fabric. The temperature at the time of application was about 60° C.

Test 4

A coat of untreated standard asphalt emulsion[1] was applied on an existing smooth surface asbestos build-up roof which had a very dry surface. A one ply glass fabric which had been previously impregnated with hot asphalt was then placed over the coated roof. A final coat of untreated standard asphalt emulsion[1] was then applied over the glass fabric. Temperature was about 55° C.

Test 5

A coat of standard asphalt emulsion[1] containing a 1% of a 15% solution of the sodium salt of wax-substituted diphenyl ether sulphonic acid disulphide was applied on an existing smooth surface asbestos build-up roof which had a very dry surface. A one ply glass fabric which had been previously impregnated with hot asphalt was then placed over the coated roof. A final coat of standard asphalt emulsion containing 1% of a 15% solution of the sodium salt of wax-substituted diphenyl ether sulphonic acid disulphide was then applied over the glass fabric. Temperature was about 55° C.

The above tests were carefully observed and from such observations the following results were obtained and are tabulated in the table below.

TABLE A

| Test No. | Wetting Characteristics | Penetrability of Fabric | Setting Time | Bonding Characteristics | Fluidity of Emulsion | Plasticity of Set Emulsion | Addition Agent |
|---|---|---|---|---|---|---|---|
| 1 | Does not wet fabric. | Does not penetrate. | 8 hrs | Does not bond with metal. | Static | Poor | None. |
| 2 | Good | Poor | Sets in 2 hrs. but "skins" and will blister. | do | Flowable but not fluid. | Fair | Sodium petroleum sulphonate. |
| 3 | Excellent | Excellent | Sets completely in 2 hrs. with no trapped water. | Bonds completely with all contours of metal. | Very fluid | Excellent | Sodium salt of disulphide of wax-diphenyl ether sulphonic acid. |
| 4 | Does not wet fabric. | Does not penetrate. | 6 hrs | Does not bond with roofing asbestos. | Static | Poor | None. |
| 5 | Excellent | Excellent | Sets completely in 2 hrs. with no trapped water. | Bonds completely with all contours of roofing. | Very fluid | Excellent | As in 3. |

The final test of any roofing composition is its ability to stand up under all types of weathering conditions. It therefore becomes convenient at this point to give comparative weathering data obtained from weathering tests conducted on a number of asphalt emulsions containing different asphalt addition agents.

The following asphalt emulsions were prepared and each was then applied to a clean aluminum strip to form a 0.015" film on the strips. The strips were cured for 48 hours at room temperature and then placed in a standard Atlas weatherometer for a period of 500 hours. For a full description of the procedure employed in conducting these tests in the Atlas Weatherometer, reference may be had to the catalogue entitled "Atlas Weatherometers" published by Atlas Electric Devices Co., Chicago 10, Illinois. The results of the above tests are tabulated in the following table.

[1] Standard asphalt emulsion containing 50% solids, 46% water, 4% bentonite.

TABLE B

| Sample No. | Composition [1] | Fluidity Rating of Composition | Appearance 300 hours | Appearance 400 hours | Appearance 500 hours | Rating at 500 hours Surface Oxidation | Rating at 500 hours Plasticity | Rating at 500 hours Overall |
|---|---|---|---|---|---|---|---|---|
| 1 | Standard emulsion 10% water added.[2] | 6—Static, does not flow. | Fair—few small pits and hard spots, surface oxidation sl. | Failed—Cracked through to metal. | Failed | 2 | 5 | 5 |
| 2 | Standard emulsion 5% water added.[2] | 7—Static, does not flow. | do | do | do | 6 | 6 | 6 |
| 3 | Standard emulsion 0.83% sodium petroleum sulphonate, 2.5% water.[2] | 5—Slightly flowable, not fluid. | Failed—weathered through to metal in spots. | Failed—Surface oxidation present. | do | 7 | 7 | 7 |
| 4 | Standard emulsion 1.0% sodium salt of wax-substituted diphenyl ether sulphonic acid disulphide, 6% water.[2] | 2—Very fluid | Good—small pits, very slight surface oxidation. | Fair—Pits somewhat deeper, surface oxidation more pronounced. | Fair—Ridging pronounced. | 4 | 4 | 3 |
| 5 | Standard emulsion 0.5% sodium salt of wax-substituted diphenyl ether sulphonic acid disulphide, 3% water.[2] | 4—Very fluid | Excellent—very little pitting, very slight surface oxidation. | Excellent—little pitting, slight surface oxidation. | Good—surface intact, but hard sub-surface plastic; some thin spots. | 3 | 2 | 2 |
| 6 | Standard emulsion 1.0% sodium salt of wax-substituted diphenyl ether sulphonic acid, 5.0% water.[2] | 1—Very fluid | Good—small pits, very slight surface oxidation. | Fair—Pits somewhat deeper, surface oxidation more pronounced. | Fair—Ridging pronounced. | 5 | 3 | 4 |
| 7 | Standard emulsion 0.5% sodium salt of wax-substituted diphenyl ether sulphonic acid, 3.5% water.[2] | 3—Very fluid | Excellent—no pitting, very slight surface oxidation. | Excellent—very slight pitting; slight surface oxidation. | Good—surface intact but hard, sub-surface plastic. | 1 | 1 | 1 |

[1] Additive percents are on dry weight basis.
[2] Standard emulsion containing 50% solids, 4% bentonite.

Another use for which the improved asphalt emulsions of the present invention have been found adaptable is as a weave set for cloth such as loosely-woven glass cloth. In the past a wide variety of compositions including hot asphalt, asphalt emulsion, additive-treated asphalt emulsions, etc., have been employed for this purpose without success. In each instance asphalt materials were highly viscous and did not wet or penetrate the cloth properly. On the contrary, the composition coated only the outer surface of the thread and did not penetrate within to coat the individual strands that go to make up the thread. In order to have a satisfactory weave set, such penetration must take place. Furthermore, in each instance, the asphalt compositions bridged and clogged the mesh of the cloth thereby rendering the cloth almost completely non-porous. For ordinary uses the cloth was unsuited.

I have found, however, that a standard asphalt emulsion containing my addition agents within the range previously given and particularly when using 1 to 4% by weight of a 15% water solution of the additive may be employed with good results. When using my improved fluid asphalt emulsion as a weave set, the cloth is thoroughly wetted and each strand going to make up the threads of the cloth is substantially coated and thoroughly impregnated by the asphalt thereby securing the strands in the thread to each other. Moreover there was no bridging or clogging of the mesh.

It should be noted when employing my improved asphalt emulsion as a weave set, the finished product is somewhat tacky and for certain uses this tackiness may be objectionable. To obviate this difficulty, it has been found that a paste composed of gilsonite, blood albumen and water such that there is 10-20% of the gilsonite suspended in the composition may be employed to overcome the slight tackiness.

A process which may be employed in removing this tackiness is as follows: A glass fabric (24 x 24 mesh) is passed into a trough containing an additive-treated emulsion having a composition corresponding to that used in test 3 above where it is submerged by means of a roller. On emergence from the coating bath, the fabric passes between squeeze rollers to express the excess emulsion. Doctor knives on the squeeze rolls prevent build-up of hardened emulsion. The coated fabric then passes through an infra-red oven with forced air circulation maintained at about 370° F. where the emulsion is set and the majority of water expelled. At the very end of the oven the coated fabric is passed into a second trough similar to the first, but containing the gilsonite suspension, as described above, agitated by compressed air. On emergence from the rolls of the gilsonite bath, the fabric makes a second pass through an infra-red oven where the water is evaporated and the gilsonite is fused on the surface. The coated fabric is then rolled for storage and shipment.

Another use for which my improved emulsions may be employed is as a bonding and coating material for glass mats or felts. At the present time this is being accomplished by the use of a synthetic resin such as furfuryl-phenol. Such products possess numerous deficiencies, the principal ones being that the mat or felt lacks tensile strength and is not readily wet by asphalt. Hot asphalt has been employed also as a bonding material, but the resultant product was not properly bonded and was completely nonporous.

It has been found that the asphalt emulsions containing my addition agents overcome all these prior difficulties. The glass mats or felts treated with my improved asphalt emulsion are wetted exceptionally well and possess high tensile strength. The finished products were thoroughly bonded and fully porous.

One method which may be employed on glass felt is to add from 2 to 4% of my addition agents to a standard asphalt emulsion and dilute it with water to a 10-20% solid concentration. This emulsion is then sprayed on one side of a furfuryl-resin-bonded felt. It should be noted that it is necessary to spray but one side of the felt since the additive-treated emulsions penetrate the material so that the fibers are well coated. The finished products are more flexible and possess a higher tensile strength than the treated felts previously produced.

A preferred method, omitting the furfuryl-resin treatment, of producing glass mats and felts is to spin the glass strands from a spinneret on to a moving conveyor belt. The speed at which the conveyor belt moves determines the thickness of the mat or felt. In my coating and bonding process, the strands are sprayed as they emerge from the spinneret and before they fall on to the conveyor with an asphalt emulsion to which has been added from 2-4% of my addition agent, and which has been thinned with water to 10-20% solids. The coated strands then fall on to the conveyor belt and are bonded to one another to form the mat. The finished product wets exceptionally well, is quite plastic, possesses very high tensile strength, and is porous.

Another use in which my improved asphalt emulsion has been put is in the production of asphalt paper. This product is made in the ordinary manner from a paper fiber pulp admixed with asphalt emulsion. The major difficulty with the prior products is low tensile strength. I have found that my improved asphalt emulsions when incorporated with such paper fibers will produce a superior and improved asphalt paper having a very high tensile strength.

There are many other uses in which my improved asphalt emulsions may be employed, the previously mentioned uses being indicative of but a few. Other illustrative uses are in asphalt road compositions containing mineral aggregate wherein the high fluidity, quick-setting, setting and high bonding properties of my improved emulsion will be found to be of particular advantage. In any process where high stability, good bonding, and quick-setting properties are required, my improved asphalt emulsion will be found particularly useful. Likewise, my improved asphalt emulsion is of utility as a bonding agent or backing for various types of films, for a vapor barrier in laminated papers, in bonding fiberboard, etc.

Other modes of applying the principle of the invention may be employed, change being made as regards the details described, provided the features stated in any of the following claims, or the equivalent of such, be employed.

I, therefore, particularly point out and distinctly claim as my invention:

1. An asphaltic emulsion comprising a major amount of a stable clay asphalt-in-water emulsion and a minor amount of a surface active agent, which surface active agent is slightly water soluble but to only a minor extent and is soluble in asphaltic materials to a substantially greater extent, said surface active agent comprising sodium paraffin wax hydroxy phenyl sulfonate.

2. An asphaltic emulsion comprising a major amount of a stable clay asphalt-in-water emulsion and a minor amount of a surface active agent, which surface active agent is slightly water soluble but to only a minor extent and is soluble in asphaltic materials to a substantially greater extent, said surface active agent comprising an alkali metal paraffin wax hydroxy phenyl sulfonate.

WILLIS G. CRAIG.

References Cited in the file of this patent

UNITED STATES PATENTS

| Number | Name | Date |
| --- | --- | --- |
| 1,237,852 | Zimmer | Aug. 21, 1917 |
| 1,690,020 | Kirschbraun | Oct. 30, 1928 |
| 1,751,690 | Faben | Mar. 25, 1930 |
| 1,854,348 | Rodewald | Apr. 19, 1932 |
| 2,033,657 | Smith | Mar. 10, 1936 |
| 2,197,835 | Reiff | Apr. 23, 1940 |
| 2,317,959 | Johnson et al. | Apr. 27, 1943 |
| 2,336,468 | Cole et al. | Dec. 14, 1943 |
| 2,393,573 | Sommer | Jan. 22, 1946 |
| 2,416,134 | Allen | Feb. 18, 1947 |
| 2,433,847 | Jennings et al. | Jan. 6, 1948 |
| 2,442,972 | Edelstein | June 8, 1948 |
| 2,503,246 | Craig | Apr. 11, 1950 |